(12) United States Patent
Zakarauskas

(10) Patent No.: US 8,428,945 B2
(45) Date of Patent: *Apr. 23, 2013

(54) ACOUSTIC SIGNAL CLASSIFICATION SYSTEM

(75) Inventor: Pierre Zakarauskas, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,621

(22) Filed: May 11, 2011

(65) Prior Publication Data

US 2011/0213612 A1 Sep. 1, 2011

Related U.S. Application Data

(63) Continuation of application No. 11/540,153, filed on Sep. 29, 2006, now Pat. No. 7,957,967, which is a continuation-in-part of application No. 09/385,975, filed on Aug. 30, 1999, now Pat. No. 7,117,149.

(51) Int. Cl.
*G10L 15/20* (2006.01)

(52) U.S. Cl.
USPC .......................................................... 704/233

(58) Field of Classification Search .................. 704/201, 704/205, 233, 226
See application file for complete search history.

(56) References Cited

U.S. PATENT DOCUMENTS

| | | | |
|---|---|---|---|
| 4,486,900 A | 12/1984 | Cox et al. | |
| 4,531,228 A | 7/1985 | Noso et al. | |
| 4,630,305 A | 12/1986 | Borth et al. | |
| 4,811,404 A | 3/1989 | Vilmur et al. | |
| 4,821,325 A | 4/1989 | Martin et al. | |
| 4,843,562 A | 6/1989 | Kenyon et al. | |
| 4,998,280 A | * 3/1991 | Amano et al. | 704/254 |
| 5,027,410 A | 6/1991 | Williamson et al. | |
| 5,056,150 A | 10/1991 | Yu et al. | |
| 5,146,539 A | 9/1992 | Doddington et al. | |
| 5,313,555 A | 5/1994 | Kamiya | |
| 5,400,409 A | 3/1995 | Linhard | |
| 5,463,618 A | 10/1995 | Furukawa et al. | |
| 5,475,791 A | 12/1995 | Schalk et al. | |
| 5,479,517 A | 12/1995 | Linhard | |

(Continued)

FOREIGN PATENT DOCUMENTS

| | | |
|---|---|---|
| CA | 2158847 | 9/1994 |
| CA | 2157496 | 10/1994 |

(Continued)

OTHER PUBLICATIONS

Avendano, C., Hermansky, H., "Study on the Dereverberation of Speech Based on Temporal Envelope Filtering," Proc. ICSLP '96, pp. 889-892, Oct. 1996.

(Continued)

*Primary Examiner* — Angela A Armstrong
(74) *Attorney, Agent, or Firm* — Brinks Hofer Gilson & Lione

(57) ABSTRACT

A system classifies the source of an input signal. The system determines whether a sound source belongs to classes that may include human speech, musical instruments, machine noise, or other classes of sound sources. The system is robust, performing classification despite variation in sound level and noise masking. Additionally, the system consumes relatively few computational resources and adapts over time to provide consistently accurate classification.

18 Claims, 5 Drawing Sheets

U.S. PATENT DOCUMENTS

| | | | |
|---|---|---|---|
| 5,495,415 | A | 2/1996 | Ribbens et al. |
| 5,502,688 | A * | 3/1996 | Recchione et al. ........... 367/131 |
| 5,526,466 | A | 6/1996 | Takizawa |
| 5,568,559 | A | 10/1996 | Makino |
| 5,584,295 | A | 12/1996 | Muller et al. |
| 5,617,508 | A | 4/1997 | Reaves |
| 5,677,987 | A | 10/1997 | Seki et al. |
| 5,680,508 | A | 10/1997 | Liu |
| 5,692,104 | A | 11/1997 | Chow et al. |
| 5,701,344 | A | 12/1997 | Wakui |
| 5,708,704 | A | 1/1998 | Fisher |
| 5,809,453 | A * | 9/1998 | Hunt ............................ 704/214 |
| 5,933,801 | A | 8/1999 | Fink et al. |
| 5,949,888 | A | 9/1999 | Gupta et al. |
| 6,011,853 | A | 1/2000 | Koski et al. |
| 6,163,608 | A | 12/2000 | Romesburg et al. |
| 6,167,375 | A | 12/2000 | Miseki et al. |
| 6,173,074 | B1 | 1/2001 | Russo |
| 6,175,602 | B1 | 1/2001 | Gustafsson et al. |
| 6,192,134 | B1 | 2/2001 | White et al. |
| 6,199,035 | B1 | 3/2001 | Lakaniemi et al. |
| 6,405,168 | B1 | 6/2002 | Bayya et al. |
| 6,434,246 | B1 | 8/2002 | Kates et al. |
| 6,507,814 | B1 | 1/2003 | Gao |
| 6,587,816 | B1 | 7/2003 | Chazan et al. |
| 6,643,619 | B1 | 11/2003 | Linhard et al. |
| 6,687,669 | B1 | 2/2004 | Schrögmeier et al. |
| 6,782,363 | B2 | 8/2004 | Lee et al. |
| 6,822,507 | B2 | 11/2004 | Buchele |
| 6,859,420 | B1 | 2/2005 | Coney et al. |
| 6,910,011 | B1 | 6/2005 | Zakarauskas |
| 7,117,149 | B1 | 10/2006 | Zakarauskas |
| 2001/0028713 | A1 | 10/2001 | Walker |
| 2002/0071573 | A1 | 6/2002 | Finn |
| 2002/0176589 | A1 | 11/2002 | Buck et al. |
| 2003/0040908 | A1 | 2/2003 | Yang et al. |
| 2003/0216907 | A1 | 11/2003 | Thomas |
| 2004/0078200 | A1 | 4/2004 | Alves |
| 2004/0138882 | A1 | 7/2004 | Miyazawa |
| 2004/0165736 | A1 | 8/2004 | Hetherington et al. |
| 2004/0167777 | A1 | 8/2004 | Hetherington et al. |
| 2005/0114128 | A1 | 5/2005 | Hetherington et al. |
| 2005/0240401 | A1 | 10/2005 | Ebenezer |
| 2006/0034447 | A1 | 2/2006 | Alves et al. |
| 2006/0074646 | A1 | 4/2006 | Alves et al. |
| 2006/0100868 | A1 | 5/2006 | Hetherington et al. |
| 2006/0115095 | A1 | 6/2006 | Giesbrecht et al. |
| 2006/0116873 | A1 | 6/2006 | Hetherington et al. |
| 2006/0136199 | A1 | 6/2006 | Nongpiur et al. |
| 2006/0251268 | A1 | 11/2006 | Hetherington et al. |
| 2006/0287859 | A1 | 12/2006 | Hetherington et al. |

FOREIGN PATENT DOCUMENTS

| | | |
|---|---|---|
| CA | 2158064 | 10/1994 |
| EP | 0 076 687 A1 | 4/1983 |
| EP | 0 629 996 A2 | 12/1994 |
| EP | 0 629 996 A3 | 12/1994 |
| EP | 0 750 291 A1 * | 12/1996 |
| EP | 1 450 353 A1 | 8/2004 |
| EP | 1 450 354 A1 | 8/2004 |
| EP | 1 669 983 A1 | 6/2006 |
| JP | 06269084 A2 | 9/1994 |
| JP | 06319193 A | 11/1994 |
| WO | WO 00-41169 A1 | 7/2000 |
| WO | WO 01-56255 A1 | 8/2001 |
| WO | WO 01-73761 A1 | 10/2001 |

OTHER PUBLICATIONS

Berk et al., "Data Analysis with Microsoft Excel", Duxbury Press, 1998, pp. 236-239 and 256-259.

Fiori, S., Uncini, A., and Piazza, F., "Blind Deconvolution by Modified Bussgang Algorithm", Dept. of Electronics and Automatics—University of Ancona (Italy), ISCAS 1999.

Learned, R.E. et al., A Wavelet Packet Approach to Transient Signal Classification, Applied and Computational Harmonic Analysis, Jul. 1995, pp, 265-278, vol. 2, No. 3, USA, XP 000972660. ISSN: 1063-5203. abstract.

Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Decision Sine-Wave Vector Quantizer, International Conference on Acoustics, Speech & Signal Processing, Apr. 3, 1990, pp. 821-824, vol. Conf. 15, IEEE ICASSP, New York, US, XP 000146895, Abstract, Paragraph 3.1.

Quélavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998, pp. 330-333, XP 000974500. 1998, Turku, Finland, Syst. Eng. Assoc., Finland. ISBN: 951-97868-0-5. abstract, p. 30 paragraph 1.

Seely, S., "An Introduction to Engineering Systems", Pergamon Press Inc., 1972, pp. 7-10.

Shust, Michael R. and Rogers, James C., Abstract of "Active Removal of Wind Noise From Outdoor Microphones Using Local Velocity Measurements", J. Acoust. Soc. Am., vol. 104, No. 3, Pt 2, 1998, 1 page.

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.

Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.

Vieira, J., "Automatic Estimation of Reverberation Time", Audio Engineering Society, Convention Paper 6107, 116th Convention, May 8-11, 2004, Berlin, Germany, pp. 1-7.

Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.

Zakarauskas, P., Detection and Localization of Nondeterministic Transients in Time Series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.

* cited by examiner

# ACOUSTIC SIGNAL CLASSIFICATION SYSTEM

PRIORITY CLAIM

This application is a continuation of U.S. patent application Ser. No. 11/540,153, filed Sep. 29, 2006 now U.S. Pat. No. 7,957,967, which is a continuation-in-part of U.S. patent application Ser. No. 09/385,975, filed Aug. 30, 1999 now U.S. Pat. No. 7,117,149, each of which are incorporated by reference.

BACKGROUND OF THE INVENTION

1. Technical Field

This disclosure relates to systems and methods for automatic classification of acoustic (sound) sources, including text-independent speaker identification.

2. Related Art

There are several fields of research studying acoustic signal classification. Each field of research has adopted its own approaches to acoustic signal classification, with some overlap between them. At present, the main applications for automatic sound source classification are: speaker verification; speaker identification; passive sonar classification; and machine noise monitoring or diagnostics.

Speaker verification aims at verifying that a given speaker is indeed who he or she claims to be. In most speaker verification systems, a speaker cooperates in saying a keyword, and the system matches the way that keyword was said by the putative speaker with training samples of the same keywords. If the match is poor, the speaker is rejected or denied service (e.g., computer or premise access). A disadvantage of such methods is that the same keyword must be used at testing time as at training time, thus limiting the application of such methods to access control. This method could not be used to label the speakers in a back-and-forth conversation, for example.

Speaker identification aims at determining which among a set of voices best matches a given test utterance. Text-independent speaker identification tries to make such a determination without the use of particular keywords.

Passive sonar classification involves identifying a vessel according to the sound it radiates underwater. Machine noise monitoring and diagnostics involves determining the state of a piece of machinery through the sound it makes.

In all of the above applications, a model of each sound source is first obtained by training a system with a set of example sounds from each source. A test sample is then compared to the stored models to determine a sound source category for the test sample. Known methods require relatively long training times and testing samples that make such methods inappropriate in many cases. Further, such methods tend to require a large amount of memory storage and computational resources. Finally, these methods often are not robust to the presence of noise in the test signal, which prevents their use in many tasks. ("Signal" means a signal of interest; background and distracting sounds are referred to as "noise").

Therefore a need exists to classify a noisy acoustic signal while requiring a minimum amount of training and testing.

SUMMARY

The signal classification system classifies a sound source. The system matches the acoustic input to a number of signal models, one per source class, and produces a score for each signal model. The sound source is declared to be of the same class as that of the model with the best score, if that score is sufficiently high. The classification is accomplished by the use of a signal model augmented by learning. The input signal may represent human speech, in which case the goal would be to identify the speaker in a text-independent manner. However, it should be recognized that the system may be used to classify any type of live or recorded acoustic data, such as musical instruments, birds, engine or machine noise, or human singing.

The system classifies input signals as follows: An input signal is digitized into binary data, which is transformed to a time-frequency representation (spectrogram). Background noise is estimated and a signal detector isolates periods containing signal. Periods without signal content are included in the noise estimate. The spectrogram of the input signal is rescaled and compared to spectrograms for a number of templates defining a signal model, where each signal model represents a source class. The average distortion between the measured spectrograms and the spectrograms of each signal model is calculated. The signal model with the lowest distortion is selected. If the average distortion of the selected signal model is sufficiently low, the source is declared to belong to the corresponding class. If not, the source is declared to be of unknown type.

The set of signal models is trained with signal data by creating templates from the spectrograms of the input signals when such spectrograms are significantly different from the spectrograms of existing templates. If an existing template is found that resembles the input signal spectrogram, that template is averaged with the input signal spectrogram in such a way that the resulting template is the average of all the spectra that matched that template in the past.

The system classifies an acoustic signal source, independent of the sound the source happens to be emitting at the time of sampling, and independent of sound levels. The system may also classify an acoustic signal source when some portions of the spectra of the acoustic signal are masked by noise. The system also requires relatively few training, testing data, and computational resources.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Overview of Operating Environment

Figure 1:
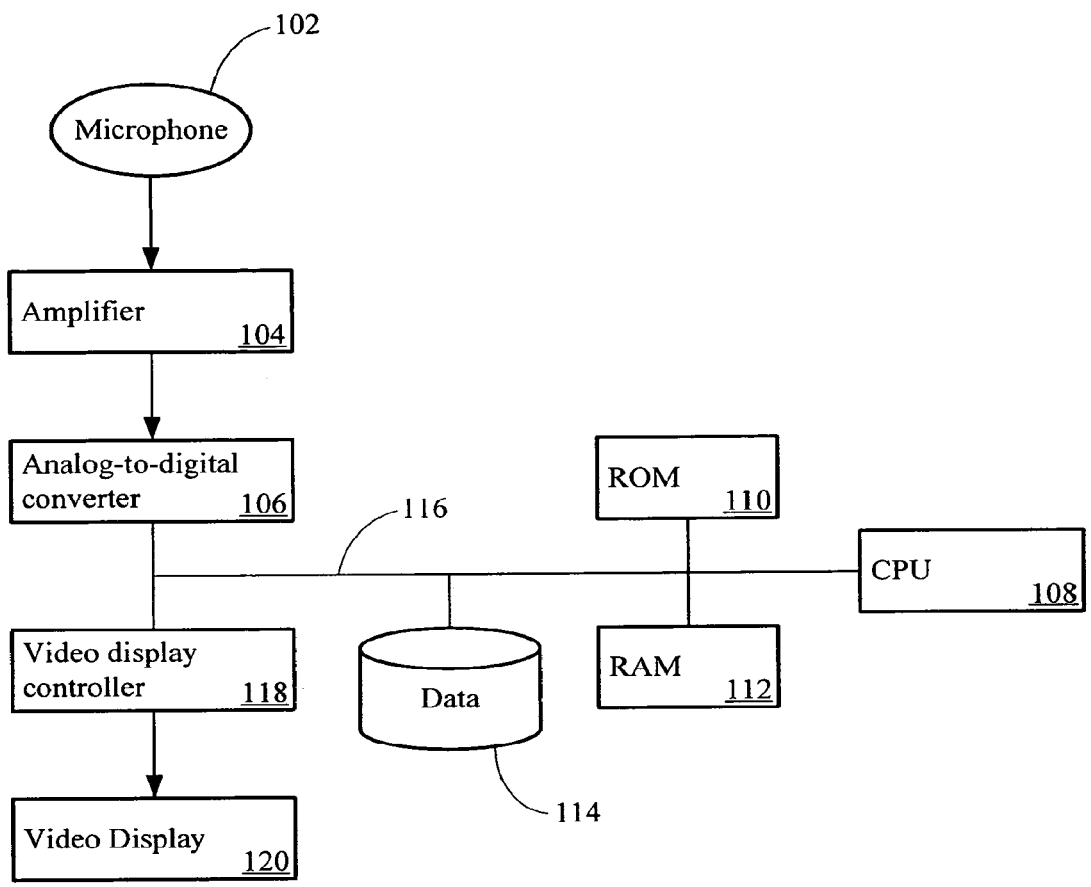
FIG. 1 is block diagram of a programmable computer system suitable for implementing the signal classification system.

FIG. 1 shows a block diagram of a programmable computer system suitable for implementing the signal classification system. An acoustic signal is received at a transducer microphone 102, which generates a corresponding electrical signal representation of the acoustic signal. The signal from the transducer microphone 102 may be amplified by an amplifier 104 before being digitized by an analog-to-digital converter 106. The output of the analog-to-digital converter 106 is applied to a processing system, which applies the classification techniques of the signal classification system. The processing system may include a CPU 108, ROM 110, RAM 112 (which may be writable, such as a flash ROM), and an optional storage device 114, such as a magnetic disk, coupled by a CPU bus 116 as shown. The output of the classification process can be displayed for the benefit of a human user by means of a video display controller 118 which drives a video display 120, or used by the system to customize its response to the identity of the sound source, or used to actuate external equipment (e.g., lock mechanisms in an access control application).

Functional Overview of System

A first functional component of the signal classification system is a pre-processor that transforms input data to a time-frequency representation. The signal classification system uses patterns of the relative power in different frequency bands and how such patterns change in the short term to classify an input signal.

Second and third functional components of the signal classification system are a dynamic background estimator and a signal detector respectively. The signal detector discriminates against continuous background noise to ensure that signal classification not influenced by background noise. The dynamic background noise estimation function separates transient sounds from background noise, and estimates the background noise alone. For example, a power detector acts in each of multiple frequency bands. Noise-only portions of the data are used to generate mean and standard deviation of the noise in decibels (dB). When the power exceeds the mean by more than a specified number of standard deviations in a frequency band, the corresponding time period is flagged as containing signal and is not used to estimate the noise-only spectrum.

A fourth functional component of the signal classification system is a harmonic detector. In the case of harmonic sounds, the harmonic detector also provides an estimate for the fundamental frequency of the signal that can be useful for classification. A harmonic detector may act as a filter as many signals of interest (e.g., human voice, music, bird singing, engine, and machinery) contain a harmonic structure. The harmonic detector is described in more detail below. The harmonic detector counts the number of harmonically related peaks in the spectrum.

A fifth functional component is a spectral rescaler. The input signal may vary. For example, the input signal may be weak or strong, close or far. Before measured spectra are matched against templates in a model, the measured spectra are rescaled to ensure that the inter-pattern distance does not depend on the overall loudness of the signal. A weighting proportional to the signal-to-noise ratio (SNR) in decibels (dB) is applied to the frequency bands during rescaling. The weights are bounded below and above by a minimum and a maximum value, respectively. The spectra are rescaled so that the weighted distance to each stored template is minimized.

A sixth functional component is a pattern matcher. The pattern matcher compares the spectrogram of the input signal to a set of signal models, each defining a class. Each signal model consists of a set of prototypical spectrograms of short duration ("templates") obtained from signals of known identity. Signal model training is accomplished by collecting spectrograms that are significantly different from prototype spectrograms previously collected. The first prototype spectrogram may be the first input signal spectrogram containing signal significantly above the noise level. For subsequent time epochs, where the input signal spectrogram is closer to any existing prototype spectrogram than a selected distance threshold, that input signal spectrogram may be averaged with the closest prototype spectrogram. Where the input signal spectrogram is farther away from any prototype spectrogram than the selected threshold, the input signal spectrogram may be declared to be a new prototype spectrogram.

The distance between templates and the measured spectrogram of the input signal may be one of several appropriate metrics, such as the Euclidean distance or a weighted Euclidean distance. For each signal model class, the template with the smallest distance to the measured input signal spectrogram is selected as the best-fitting prototype spectrogram for that class.

A seventh functional component is a classifier. A score for each class is accumulated for each input signal sample. When sufficient data has been collected from a suitable number of input signal samples, a final classification decision is made. Alternatively, a decision can be forced at any desired time or event (for example, if a period of speech is followed by a significant period of silence), and the best fitting class returned along with the score at that point.

Overview of Basic Method

Figure 2:
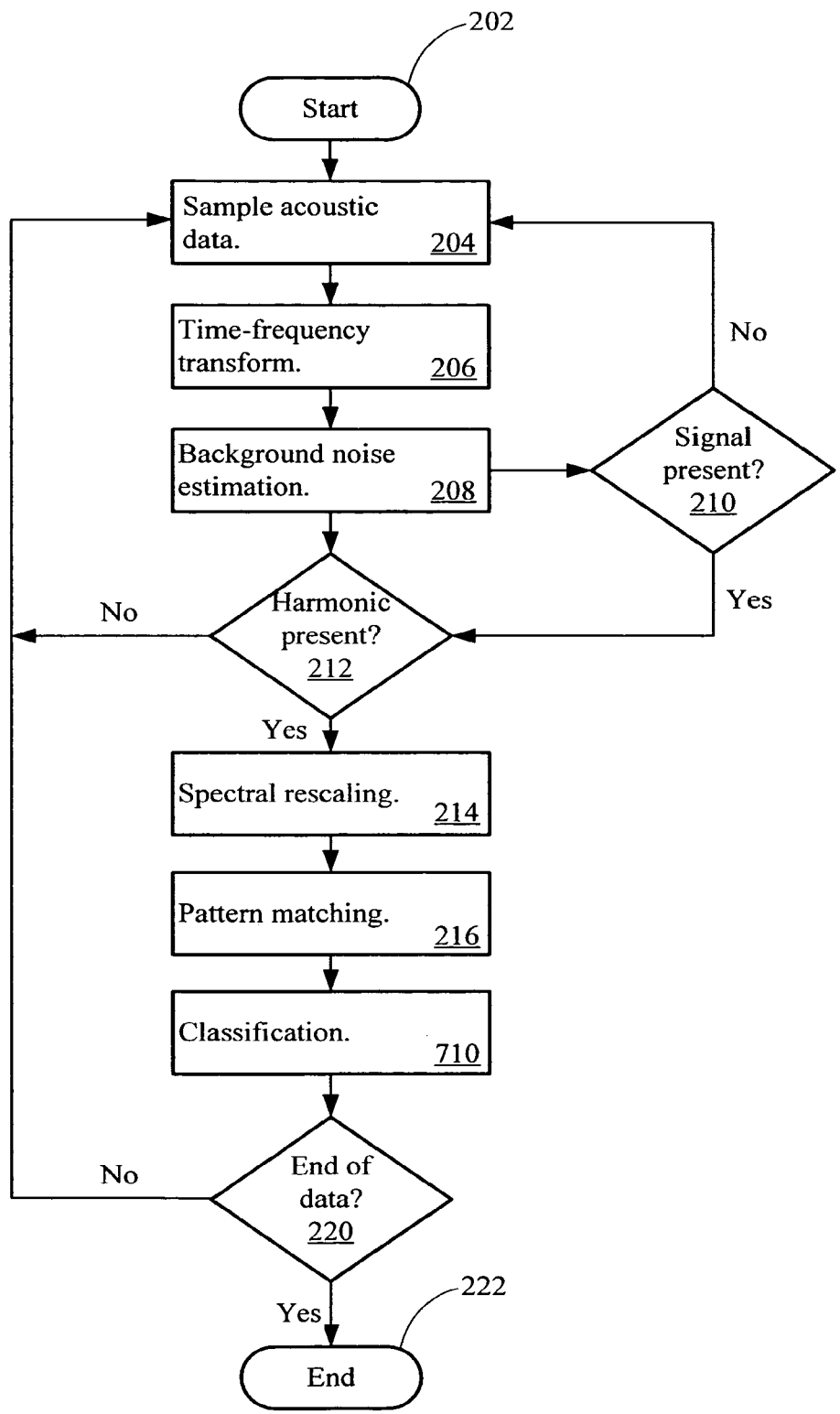
FIG. 2 is a flow diagram showing the acts taken by the signal classification system.

FIG. 2 is a flow diagram showing the acts taken by the signal classification system. The method shown in FIG. 2 enhances an incoming acoustic signal, which consists of a plurality of data samples generated as output from the analog-to-digital converter 106 shown in FIG. 1. The process begins at a Start Process state (Act 202). An incoming data stream (e.g., a previously generated acoustic data file or a digitized live acoustic signal) is read into a computer memory as a set of samples (Act 204). The signal classification system may be applied to classify from a "moving window" of data representing portions of a continuous acoustic data stream such that the entire data stream is processed. An acoustic data stream to be classified may be represented as a series of data "buffers" of fixed length, regardless of the duration of the original acoustic data stream.

The samples of a current window are subjected to a time-frequency transformation, which may include pre-filtering, shading, or other conditioning operations (Act 206). The signal classification system may use a short-time Fourier transform, banks of filter analysis, discrete wavelet transform, or other time-frequency transforms.

The time-frequency transformation transforms the initial time series input signal x(t) into a time-frequency representation $X(f, i)$, where t is the sampling index to the time series x, and f and i are discrete variables respectively indexing the frequency and time dimensions of spectrogram X. The logarithm of the magnitude of X may be used instead of X in subsequent steps unless specified otherwise, i.e.:

$$P(f,i) = 20 \log_{10}(|X(f,i)|).$$

The power level P(f,i) as a function of time and frequency will be subsequently referred to as a "spectrogram."

The signal classification system subjects the power levels in individual frequency bands f to background noise estimation (Act 208). A signal detector detects the presence of signal buried in stationary background noise (Act 210), and passes only spectrograms that include signal. The background noise estimation updates the estimate of the background noise parameters when no signal is present.

The signal classification system may include a power detector for performing background noise estimation. The power detector may average the acoustic power in a sliding window for each frequency band f. When the power within a predetermined number of frequency bands exceeds a threshold, determined as a certain number of standard deviations above the background noise, the power detector declares the presence of signal, i.e., when:

$$P(f,i) > B(f) + c\sigma(f),$$

where B(f) is the mean background noise power in band f, σ(f) is the standard deviation of the noise in that same band, and c is a constant. As an alternative, noise estimation need not be dynamic. For example, noise estimation may be performed once, such as during boot-up of a computer running software implementing the signal classification system.

The signal classification system applies a harmonic detector function to the spectrograms that are passed through the signal detector (Act 212). Harmonic detection allows the system to discriminate against signals that are not of the same harmonic class as the input signal, or in other words, signals for which no further comparison is necessary. For example, the human voice is characterized by the presence of a set of harmonics between 0.1 and about 3 kHz, with a fundamental frequency (pitch) of between 90 Hz for adult males to 300 Hz for children.

The signal classification system may then rescale the spectrograms P from Act 206 to allow them to be compared to stored templates (Act 214). The signal classification system may shift each element of the spectrogram P(f, i) up by a constant k(i, m) so that the root-mean-squared difference between P(f, i)+k(i, m) and the $m^{th}$ template T(f, m) is minimized. This is accomplished according to the following equation, where N is the number of frequency bands:

$$k(i, m) = \frac{1}{N} \sum_{f=1}^{N} [P(f, i) - T(f, m)].$$

As an alternative, the signal classification system uses weighting to rescale the templates prior to comparison. The weights w(i) are proportional to the SNR r(f, i) in band f at time i, calculated as a difference of levels, i.e. r(f, i)=P(f, i)−B(f), for each frequency band. Each element of the rescaling factor may be weighted by a weight defined as follows, where $w_{min}$ and $w_{max}$ are preset thresholds:

$$w(f,i) = w_{min} \text{ if } r(f,i) < w_{min};$$

$$w(f,i) = w_{max} \text{ if } r(f,i) > w_{max};$$

$$w(f,i) = r(f,i) \text{ otherwise.}$$

The weights may be normalized by the sum of the weights at each time frame, i.e.:

$$w'(f,i) = w(f,i)/\text{sum}_f(w(f,i)),$$

$$w'_{min} = w_{min}/\text{sum}_f(w(f,i)),$$

$$w'_{max} = w_{max}/\text{sum}_f(w(f,i)).$$

The rescaling constant are given by:

$$k(i, m) = \frac{1}{N} \sum_{f=1}^{N} [P(f, i) - T(f, m)] w'(f, i).$$

The effect of such rescaling is to align the frequency bands of the templates having a higher SNR. Resealing is optional and may not be used in all signal classification systems.

The SNR of the templates may be used as well as the SNR of the measured spectra for rescaling the templates. The SNR of template T(f, m) is defined as $r_N(f, m) = T(f, m) - B_N(f)$, where $B_N(f)$ is the background noise in frequency band f at the time of training. In a weighting scheme using both r and $r_N$, the weights $w_N$ may be defined as the square-root of the product of the weights for the templates and the spectrogram:

$$w_2(f,i,m) = w_{min} \text{ if } \sqrt{r_N(f,m)r(f,i)} < w_{min};$$

$$w_2(f,i,m) = w_{max} \text{ if } \sqrt{r_N(f,m)r(f,i)} > w_{max};$$

$$w_2(f,i,m) = \sqrt{r_N(f,m)r(f,i)} > w_{max} \text{ otherwise.}$$

Other combinations of $r_N$ and r may be used. The weights may be normalized by the sum of the weights at each time frame:

$$w'_2(f,i) = w_2(f,i)/\text{sum}_f(w_2(f,i)),$$

$$w'_{min} = w_{min}/\text{sum}_f(w_2(f,i)),$$

$$w'_{max} = w_{max}/\text{sum}_f(w_2(f,i)).$$

After spectral rescaling, the signal classification system performs pattern matching to find a template T* in a signal model that best matches the current spectrogram P(f, i) (Act 216). There exists some latitude in the definition of the term "best match," as well as in the method used to find that best match. For example, the template with the smallest r.m.s. (root mean square) difference d* between P+k and T* is found. As another example, the weighted r.m.s. distance is used, where $$d(i, m) = \frac{1}{N} \sum_{f=1}^{N} [P(f, i) + k(i, m) - T(f, m)]^2 w'_2(f, i, m).$$

In this example, the frequency bands with the least SNR contribute less to the distance calculation than those bands with more SNR. The best matching template T*(i) at time i is selected by finding m such that d*(i)=$\min_m$(d(i,m)).

The signal classification system also includes a classifier. A score for each class is accumulated. When sufficient data has been collected, a decision is made. A score can be the average of the distances d(i,m) over time i. For example, the signal classification system may accumulate eight to twenty scores, each corresponding to a buffer of voiced speech (as opposed to unvoiced speech—consonants—since the buffers without voiced speech do not contain as much information as to the identity of the speaker). Other amounts of scores may also be accumulated.

The classification decision may comprise comparing a score to a threshold, resulting in a binary determination. The classification decision may also use a "soft" classifier, such as a neural network. As another alternative, a decision may be forced at a desired time or event, at which event or time the best-fitting class is returned along with the score at that point. The score may include a component that relates the contribution of the fundamental frequency to the total score. This component may be of the form $K(f_0-f_{source})^2$, where $f_0$ is the measured fundamental frequency, $f_{source}$ is the fundamental frequency of the source model, and K is a proportionality constant.

The score may be the average of the distance over time, plus a fundamental frequency term, such as $$s = \frac{1}{N}\sum_{i=I}^{I+N} d*(i) + K(f_0 - f_{source})^2,$$

where the average is taken over N points starting at time i=I. In this example, the score s is minimized. If s does not meet a selected threshold value $T_{unknown}$ for all models, then the source may be declared to be of "unknown" type. Otherwise, the source may be declared to belong to the class with the lowest score.

Single or multiple signal models, each comprising one or more templates, may be applied in various applications to classify an input acoustic signal. In the case of a single signal model, the classification is binary.

Background Noise Estimation and Signal Detection

Figure 3:
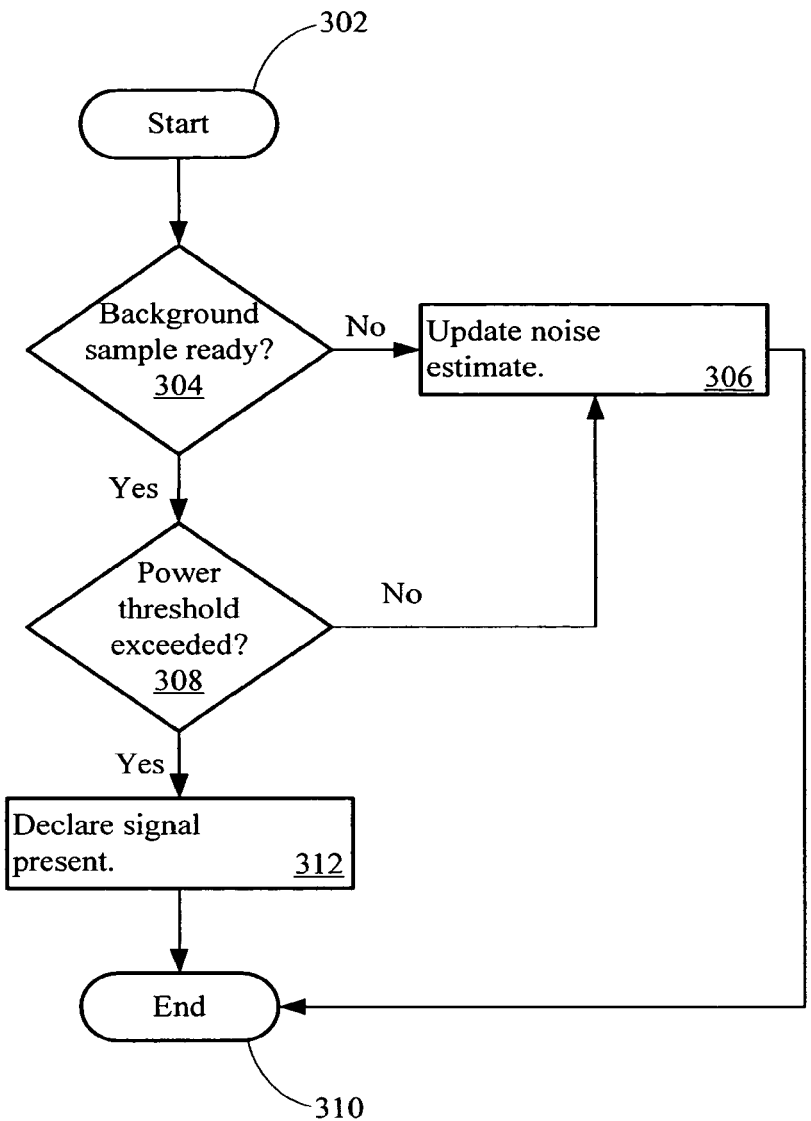
FIG. 3 is a flow diagram showing acts taken to estimate background noise parameters and to detect the presence of signal.

FIG. 3 is a flow diagram showing acts taken to estimate background noise parameters and to detect the presence of signal. The background noise estimation updates the estimates of the background noise parameters when no signal is present. A signal detector discriminates against continuous background noise to ensure that classification is based on signal only, rather than being influenced by background noise.

The process begins at a Start Process state (Act 302). The signal classification system obtains samples of background noise to use the mean and standard deviation of the noise to detect signal. The samples may be one second samples, or of other time durations. The signal classification system determines if a sufficient number of samples of background noise have been obtained (Act 304). If not, the present sample may be used to update the noise estimate (Act 306) and the process is terminated (Act 310). For example, the spectrogram elements P(f, i) may be kept in a ring buffer and used to update the mean B(f) and the standard deviation σ(f) of the noise in each frequency band f. The background noise estimate may be ready when the index i is greater than a preset threshold.

If the background samples are ready (Act 304), then a determination is made as to whether the signal level P(f, i) of a current input signal sample is significantly above the background in some of the frequency bands (Act 308). As an example, when the power within a predetermined number of frequency bands is greater than a threshold, determined as a certain number of standard deviations above the background noise mean level, the determination act indicates that the power threshold has been exceeded, i.e., when $P(f,i)>B(f)+c\sigma(f),$ where c is a constant predetermined empirically (Act 312). The process then ends (Act 310). If a sufficiently powerful signal is not detected in Act 308, then the background noise statistics are updated as in Act 306 and the process then ends (Act 310).

Harmonic Detector

Figure 4:
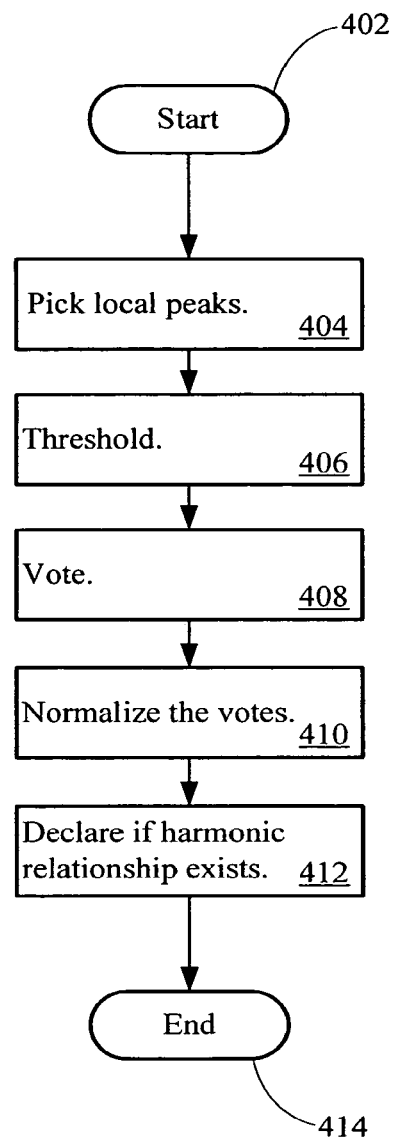
FIG. 4 is a flow diagram showing acts taken to detect the presence of harmonically related peaks in a signal spectrum.

FIG. 4 is a flow diagram showing acts taken to detect the presence of harmonically related peaks in a signal spectrum. The harmonic detector detects the presence of peaks in the spectrum of an input signal sample that have a harmonic relation between them. Harmonic detection may improve signal classification as a large proportion of sources of interest have spectra characterized as having a harmonic relationship between their frequency components.

The process begins at a Start Process state (Act 402). The transformed spectrum of an input signal sample is scanned for local peaks for frequencies up to a maximum frequency of $f_{max}$ in order to "pick" a peak (Act 404). A local peak is declared at P(f) if $P(f-1)<P(f)>P(f+1)$. The peaks that stand above the neighboring spectrum values by more than a threshold s are extracted (Act 406). For example, the peaks may be represented by those f for which $P(f-1)+\epsilon<P(f)>P(f+1)+\epsilon$. Each peak represents one "vote" for each of the fundamental frequencies $f_0$ (Act 408). The estimate of $V_0(f_0)$ may be floor $(f_{max}/f_0)$. As lower values of $f_0$ have fewer harmonics for a given $f_{max}$ than higher values of $f_0$, the votes may be normalized by the expected number of harmonics in the frequency range considered $V_0(f_0)$ (Act 410). If the ratio $V(f_0)/V_0(f_0)$ is greater than a threshold (Act 412), a harmonic relationship is declared to exist.

Pattern Matching

Figure 5:
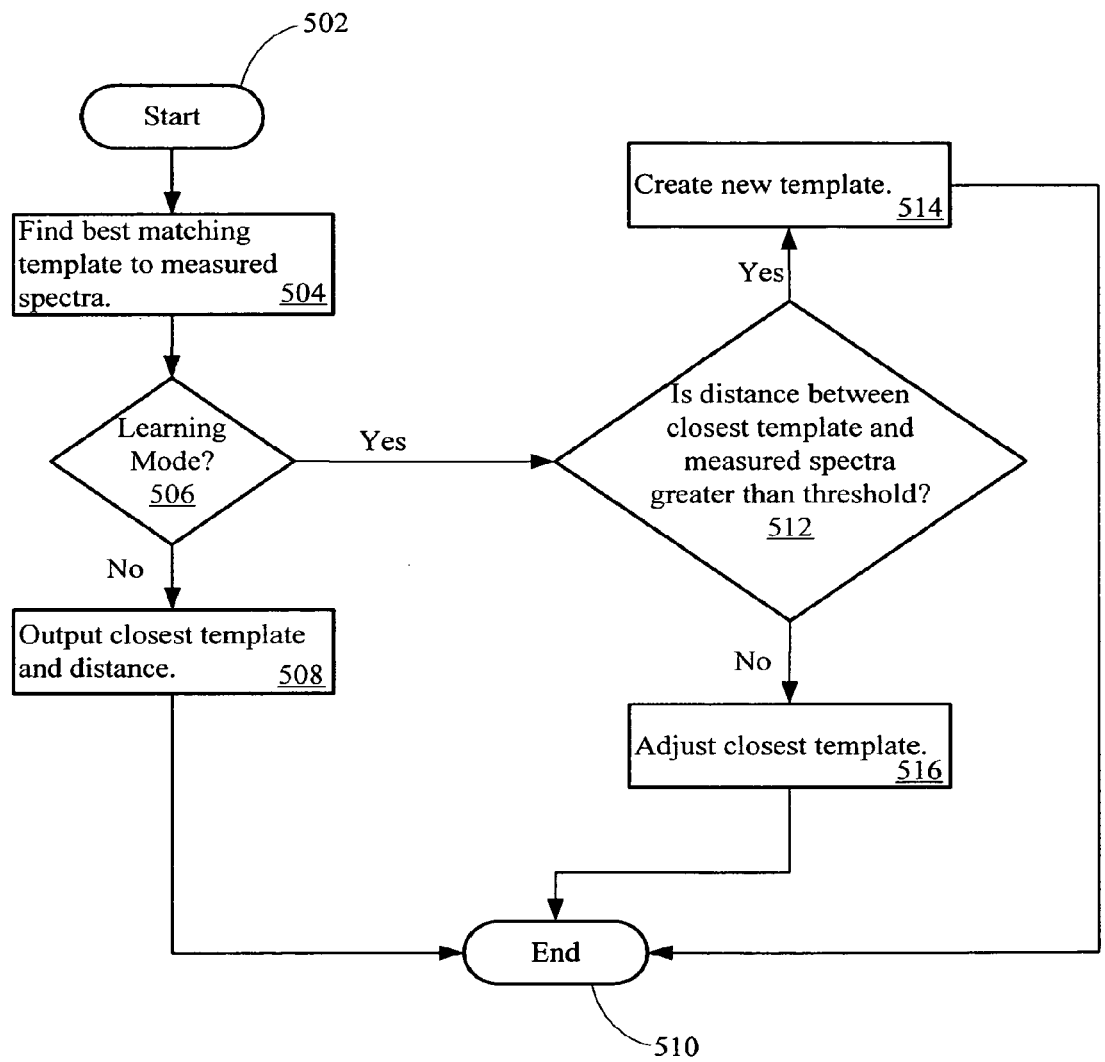
FIG. 5 is a flow diagram showing acts taken to generate and use signal model templates.

FIG. 5 is a flow diagram showing acts taken to generate and use signal model templates. The process begins at a Start Process state (Act 502). The pattern matching process finds a template T* in the signal model that best matches a current spectrogram P(f, i) (Act 504). The pattern matching process facilitates the learning process of the signal model. As discussed above, there is some latitude in the definition of the term "best match," as well as in the method used to find that best match. For example, the template with the smallest r.m.s. difference d* between P+k and T* may be found. As another example, the weighted r.m.s. distance may be used to measure the degree of match. The r.m.s. distance may be calculated by:

$$d(i,m) = \frac{1}{N}\sum_{f=1}^{N}[P(f,i)+k(i,m)-T(f,m)]^2 w_2'(f,i,m).$$

The frequency bands with the least SNR may contribute less to the distance calculation than those bands with more SNR. The signal classification system selects the best matching template T*(f, i) that is the output of Act 504 at time i by finding in such that $d*(i)=\min_m[d(i,m)]$. If the system is not in learning mode (Act 506), then T*(f, i) is also the output of the process as being the closest template (Act 508). The process then ends (Act 510).

If the system is in learning mode (Act 506), the template T*(f, i) most similar to P(f, i) is used to adjust the signal model. The manner in which T*(f, i) is incorporated in the model may be affected by the value of d*(i) (Act 512). If $d*(i)<d_{max}$, where $d_{max}$ is a predetermined threshold, then T*(f, i) may be adjusted (Act 516), and the process ends (Act 510). Act 516 may be implemented such that T*(f, i) is the average of all spectra P(f, i) used to compose T*(f, i). The number $n_m$ of spectra associated with T(f, m) may be kept in memory. When the signal classification system uses a new spectrum P(f, i) to adjust T(f, m), the adjusted template may be:

$T(f,m)=[n_m T(f,m)+P(f,i)]/(n_m+1),$ while the number of patterns corresponding to template m may be adjusted as well:

$n_m=n_m+1.$

In Act 512, where $d^*(i) > d_{max}$, a new template may be created, $T^*(f, i) = P(f, i)$, with a weight $n_m = 1$ (Act 514), and the process ends (Act 510).

Computer Implementation

The signal classification system may be implemented in hardware or software, or a combination of both, such as programmable logic arrays. Unless otherwise specified, the algorithms included as part of the signal classification system are not inherently related to any particular computer or other apparatus. In particular, various general-purpose machines may be used with programs written in accordance with the functions described above, or it may be more convenient to construct a more specialized apparatus to perform the required method steps. However, the signal classification system may be implemented in one or more computer programs executing on programmable systems. Each computer may comprise at least one processor, at least one data storage system (including volatile and non-volatile memory and/or storage elements), at least one input device, and at least one output device. Each such programmable system component constitutes a means for performing a function. The program code is executed on the processors to perform the functions described above.

Each program may be implemented in any desired computer language (including machine, assembly, high level procedural, or object oriented programming languages) to communicate with a computer system. The computer language may be a compiled or interpreted language.

Each such computer program may be stored on a storage media or device (e.g., ROM, CD-ROM, or magnetic or optical media) readable by a general or special purpose programmable computer, for configuring and operating the computer when the storage media or device is read by the computer to perform the procedures described above. The signal classification system may also be considered to be implemented as a computer-readable storage medium, configured with a computer program, where the storage medium causes a computer to operate in a specific and predefined manner to perform the functions described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for classifying a signal, comprising:
   obtaining an input signal;
   determining a time-frequency representation of the input signal;
   determining whether a signal of interest is present in the time-frequency representation;
   identifying an interval of the time-frequency representation that contains the signal of interest;
   measuring a signal-to-noise ratio of the time-frequency representation;
   rescaling frequency bands of the time-frequency representation by a weighting proportional to the measured signal-to-noise ratio of the time-frequency representation;
   comparing the rescaled time-frequency representation of the interval to a plurality of time-frequency spectrogram templates in response to identifying the interval of the time-frequency representation that contains the signal of interest; and
   selecting a matching time-frequency spectrogram template from the plurality of time-frequency spectrogram templates, by a processor, based on an amount of distortion between the rescaled time-frequency representation and at least one of the plurality of time-frequency spectrogram templates.

2. The method of claim 1, where identifying the interval comprises identifying that a harmonic is present in the interval of the time-frequency representation; and
   where comparing the rescaled time-frequency representation comprises comparing the rescaled time-frequency representation of the interval to the plurality of time-frequency spectrogram templates in response to identifying that the harmonic is present in the interval.

3. The method of claim 1, where identifying the interval comprises:
   determining a power level as a function of time and frequency for the time-frequency representation;
   estimating a background noise level for the time-frequency representation; and
   identifying that the power level exceeds the background noise level by a pre-selected threshold in the interval;
   where comparing the rescaled time-frequency representation comprises comparing the rescaled time-frequency representation of the interval to the plurality of time-frequency spectrogram templates in response to identifying that the power level exceeds the background noise level by the pre-selected threshold in the interval.

4. The method of claim 3, where the pre-selected threshold is a pre-selected number of standard deviations beyond a mean background noise level.

5. The method of claim 1, further comprising:
   identifying an interval of the time-frequency representation that does not contain signal-of-interest content; and
   forgoing spectrogram template matching for the interval of the time-frequency representation that does not contain the signal-of-interest content.

6. The method of claim 1, further comprising:
   identifying an interval of the time-frequency representation that does not contain a harmonic; and
   forgoing spectrogram template matching for the interval of the time-frequency representation that does not contain the harmonic.

7. The method of claim 1, where selecting the matching time-frequency spectrogram template comprises selecting the matching time-frequency spectrogram template, by the processor, from the plurality of time-frequency spectrogram templates based on an average distance measurement between the rescaled time-frequency representation and at least one of the plurality of spectrogram templates.

8. A method for classifying a signal, comprising:
   obtaining an input signal;
   determining a time-frequency representation of the input signal;
   determining whether a signal of interest is present in the time-frequency representation;
   identifying an interval of the time-frequency representation that contains the signal of interest;
   comparing the time-frequency representation of the interval to a plurality of time-frequency spectrogram templates in response to identifying the interval of the time-frequency representation that contains the signal of interest;
   selecting a matching time-frequency spectrogram template from the plurality of time-frequency spectrogram templates, by a processor, based on an average distance measurement between the time-frequency representation and at least one of the plurality of spectrogram templates; and weighting the time-frequency representation or the at least one of the plurality of spectrogram templates based on a measured signal-to-noise ratio so that a first frequency band of the input signal, with a lower signal-to-noise ratio than a second frequency band of the input signal, contributes less to the average distance measurement than the second frequency band.

9. A method for classifying a signal, comprising:
obtaining an input signal;
determining a time-frequency representation of the input signal;
determining whether a signal of interest is present in the time-frequency representation;
identifying an interval of the time-frequency representation that contains the signal of interest;
comparing the time-frequency representation of the interval to a plurality of time-frequency spectrogram templates in response to identifying the interval of the time-frequency representation that contains the signal of interest; and
selecting a matching time-frequency spectrogram template from the plurality of time-frequency spectrogram templates, by a processor, based on an amount of distortion between the time-frequency representation and at least one of the plurality of time-frequency spectrogram templates;
where selecting the matching time-frequency spectrogram template comprises:
calculating a first root mean square distance difference between the time-frequency representation and a first template of the plurality of time-frequency spectrogram templates;
calculating a second root mean square distance difference between the time-frequency representation and a second template of the plurality of time-frequency spectrogram templates;
identifying the first template as the matching time-frequency spectrogram in response to a determination that the first root mean square distance difference is lower than the second root mean square distance difference; and
identifying the second template as the matching time-frequency spectrogram in response to a determination that the second root mean square distance difference is lower than the first root mean square distance difference.

10. A method for classifying a signal, comprising:
obtaining an input signal;
determining a time-frequency representation of the input signal;
measuring a signal-to-noise ratio of the time-frequency representation or a template of a plurality of time-frequency spectrogram templates; and
rescaling the template according to the measured signal-to-noise ratio;
determining whether a signal of interest is present in the time-frequency representation;
identifying an interval of the time-frequency representation that contains the signal of interest;
comparing the time-frequency representation of the interval to the plurality of time-frequency spectrogram templates in response to identifying the interval of the time-frequency representation that contains the signal of interest; and
selecting a matching time-frequency spectrogram template from the plurality of time-frequency spectrogram templates, by a processor, based on an amount of distortion between the time-frequency representation and at least one of the plurality of time-frequency spectrogram templates, where selecting the matching time-frequency spectrogram template comprises comparing the time-frequency representation with the rescaled template.

11. An acoustic signal classification system, comprising:
a processor;
memory coupled to the processor, the memory comprising instructions operable to cause the processor to:
obtain an input signal;
determine a time-frequency representation of the input signal;
measure a signal-to-noise ratio of the time-frequency representation or a template of the plurality of time-frequency spectrogram templates; and
rescale the template according to the measured signal-to-noise ratio;
determine whether a signal of interest is present in the time-frequency representation;
identify an interval of the time-frequency representation that contains the signal of interest;
compare the time-frequency representation of the interval to a plurality of time-frequency spectrogram templates in response to identifying the interval of the time-frequency representation that contains the signal of interest; and
select a matching time-frequency spectrogram template from the plurality of time-frequency spectrogram templates based on an amount of distortion between the time-frequency representation and at least one of the plurality of time-frequency spectrogram templates, where the instructions operable to cause the processor to select the matching time-frequency spectrogram template comprise instructions operable to cause the processor to compare the time-frequency representation with the rescaled template.

12. An acoustic signal classification system, comprising:
a processor;
memory coupled to the processor, the memory comprising instructions operable to cause the processor to:
obtain an input signal;
determine a time-frequency representation of the input signal;
determine whether a signal of interest is present in the time-frequency representation;
identify an interval of the time-frequency representation that contains the signal of interest;
measure a signal-to-noise ratio of the time-frequency representation;
rescale frequency bands of the time-frequency representation by a weighting proportional to the measured signal-to-noise ratio of the time-frequency representation;
compare the rescaled time-frequency representation of the interval to a plurality of time-frequency spectrogram templates in response to identifying the interval of the time-frequency representation that contains the signal of interest; and
select a matching time-frequency spectrogram template from the plurality of time-frequency spectrogram templates based on an amount of distortion between the rescaled time-frequency representation and at least one of the plurality of time-frequency spectrogram templates.

13. The system of claim 12, where the instructions operable to cause the processor to identify the interval comprise instructions operable to cause the processor to identify that a harmonic is present in the interval of the time-frequency representation; and where the instructions operable to cause the processor to compare the rescaled time-frequency representation comprise instructions operable to cause the processor to compare the rescaled time-frequency representation of the interval to the plurality of time-frequency spectrogram templates in response to identifying that the harmonic is present in the interval.

14. The system of claim 12, where the instructions operable to cause the processor to identify the interval comprises instructions operable to cause the processor to:
    determine a power level as a function of time and frequency for the time-frequency representation;
    estimate a background noise level for the time-frequency representation; and
    identify that the power level exceeds the background noise level by a pre-selected threshold in the interval;
    where the instructions operable to cause the processor to compare the rescaled time-frequency representation comprise instructions operable to cause the processor to compare the rescaled time-frequency representation of the interval to the plurality of time-frequency spectrogram templates in response to identifying that the power level exceeds the background noise level by the pre-selected threshold in the interval.

15. The system of claim 12, the memory further comprising instructions operable to cause the processor to:
    identify an interval of the time-frequency representation that does not contain a harmonic; and
    forgo spectrogram template matching for the interval of the time-frequency representation that does not contain the harmonic.

16. A product, comprising:
    a non-transitory computer readable medium; and
    instructions stored on the non-transitory computer readable medium that cause a processor in a signal processing system to:
        obtain an input signal;
        determine a time-frequency representation of the input signal;
        determine whether a signal of interest is present in the time-frequency representation; identify an interval of the time-frequency representation that contains the signal of interest;
        measure a signal-to-noise ratio of the time-frequency representation;
        rescale the time-frequency representation according to the measured signal-to-noise ratio of the time-frequency representation;
        compare the time-frequency representation of the interval to a plurality of time-frequency spectrogram templates in response to identifying the interval of the time-frequency representation that contains the signal of interest; and
        select a matching time-frequency spectrogram template from the plurality of time-frequency spectrogram templates based on an amount of distortion between the time-frequency representation and at least one of the plurality of time-frequency spectrogram templates.

17. An acoustic signal classification system, comprising:
    a processor;
    memory coupled to the processor, the memory comprising instructions operable to cause the processor to:
        obtain an input signal;
        determine a time-frequency representation of the input signal;
        determine whether a signal of interest is present in the time-frequency representation;
        identify an interval of the time-frequency representation that contains the signal of interest;
        compare the time-frequency representation of the interval to a plurality of time-frequency spectrogram templates in response to identifying the interval of the time-frequency representation that contains the signal of interest;
        select a matching time-frequency spectrogram template from the plurality of time-frequency spectrogram templates based on an average distance measurement between the time-frequency representation and at least one of the plurality of spectrogram templates; and
        weight the time-frequency representation or the at least one of the plurality of spectrogram templates based on a measured signal-to-noise ratio so that a first frequency band of the input signal, with a lower signal-to-noise ratio than a second frequency band of the input signal, contributes less to the average distance measurement than the second frequency band.

18. An acoustic signal classification system, comprising:
    a processor;
    memory coupled to the processor, the memory comprising instructions operable to cause the processor to:
    obtain an input signal;
    determine a time-frequency representation of the input signal;
    determine whether a signal of interest is present in the time-frequency representation;
    identify an interval of the time-frequency representation that contains the signal of interest;
    compare the time-frequency representation of the interval to a plurality of time-frequency spectrogram templates in response to identifying the interval of the time-frequency representation that contains the signal of interest; and
    select a matching time-frequency spectrogram template from the plurality of time-frequency spectrogram templates based on an amount of distortion between the time-frequency representation and at least one of the plurality of time-frequency spectrogram templates;
    where the instructions operable to cause the processor to select the matching time-frequency spectrogram template comprise instructions operable to cause the processor to:
    calculate a first root mean square distance difference between the time-frequency representation and a first template of the plurality of time-frequency spectrogram templates;
    calculate a second root mean square distance difference between the time-frequency representation and a second template of the plurality of time-frequency spectrogram templates;
    identify the first template as the matching time-frequency spectrogram in response to a determination that the first root mean square distance difference is lower than the second root mean square distance difference; and
    identify the second template as the matching time-frequency spectrogram in response to a determination that the second root mean square distance difference is lower than the first root mean square distance difference.

* * * * *